United States Patent
Niedermair et al.

(10) Patent No.: US 7,286,989 B1
(45) Date of Patent: Oct. 23, 2007

(54) SPEECH-PROCESSING SYSTEM AND METHOD

(75) Inventors: Gerhard Niedermair, Vierkirchen (DE); Peter Karsten, Neuried (DE); Steffen Harengel, München (DE); Florian Murr, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,242

(22) PCT Filed: Sep. 2, 1997

(86) PCT No.: PCT/DE97/01920

§ 371 (c)(1),
(2), (4) Date: Mar. 2, 1999

(87) PCT Pub. No.: WO98/10413

PCT Pub. Date: Mar. 12, 1998

(30) Foreign Application Priority Data

Sep. 3, 1996 (DE) ................................. 196 35 754

(51) Int. Cl.
*G10L 21/00* (2006.01)
(52) U.S. Cl. ...................... 704/275; 704/270
(58) Field of Classification Search ............... 704/254, 704/231, 251, 270, 275; 379/88.01, 88.02
See application file for complete search history.

(56) References Cited

U.S. PATENT DOCUMENTS

| | | | | |
|---|---|---|---|---|
| 4,829,576 A | * | 5/1989 | Porter ......................... | 704/235 |
| 4,903,304 A | * | 2/1990 | Schlang et al. ............. | 704/251 |
| 5,036,539 A | * | 7/1991 | Wrench et al. ............. | 704/246 |
| 5,553,119 A | * | 9/1996 | McAllister et al. ......... | 379/88.01 |
| 5,572,624 A | * | 11/1996 | Sejnoha ....................... | 704/256.2 |
| 5,581,600 A | * | 12/1996 | Watts et al. ............. | 379/88.02 |
| 5,586,171 A | * | 12/1996 | McAllister et al. ......... | 379/88.02 |
| 5,638,425 A | * | 6/1997 | Meador et al. ........... | 379/88.01 |
| 5,677,991 A | * | 10/1997 | Hsu et al. .................... | 704/255 |
| 5,684,924 A | * | 11/1997 | Stanley et al. ............. | 704/233 |

(Continued)

FOREIGN PATENT DOCUMENTS

DE      44 12 309 A1    10/1995

(Continued)

OTHER PUBLICATIONS

Caspari, Rudolf, 1993, Bottom Up Generation from Flat Semantic Structures, Proc. Dekalarative und prozedurale Aspekte der Sprachverarbeitung, Deutsche Gesellschaft für Sprachverarbeitung, Sektion Computerlinguistik, 4th Technical Conceference, pp. 1-6.

(Continued)

*Primary Examiner*—Michael N Opsasnick
(74) *Attorney, Agent, or Firm*—Staas & Halsey LLP

(57) ABSTRACT

A speech processing system has an arbitrary number of speech recognition modules (Ei, i=1 . . . n) and speech output modules (Aj, j−1 . . . m). The modules provided respectively for a particular type of speech recognition or, respectively, speech output are selected and activated and parameterized according to the situation of application, dependent on an input signal (ES), by a device (MA) for selecting the modules, so that the selected modules are applied for speech recognition or, respectively, speech output corresponding to their construction.

11 Claims, 4 Drawing Sheets

U.S. PATENT DOCUMENTS

| | | | |
|---|---|---|---|
| 5,719,921 A * | 2/1998 | Vysotsky et al. | 379/88.01 |
| 5,794,196 A * | 8/1998 | Yegnanarayanan et al. | 704/255 |
| 5,832,430 A * | 11/1998 | Lleida et al. | 704/256 |
| 5,960,393 A * | 9/1999 | Cohrs et al. | 704/240 |
| 6,075,844 A * | 6/2000 | Goldberg et al. | 379/88.17 |
| 6,374,219 B1 * | 4/2002 | Jiang | 704/255 |
| 6,839,670 B1 * | 1/2005 | Stammler et al. | 704/251 |

FOREIGN PATENT DOCUMENTS

| | | |
|---|---|---|
| EP | 0 607 615 A1 | 7/1994 |
| EP | 0 730 261 A2 | 9/1996 |
| GB | 2 119 208 | 11/1993 |
| WO | WO96/18260 | 6/1996 |

OTHER PUBLICATIONS

Naumann, Seve et al, 1994, Parsing, Stuttgart, Teubner, 1st edition, ISBN 3-519-02139-0, pp. 155-166.

* cited by examiner

SPEECH-PROCESSING SYSTEM AND METHOD

In standard speech processing systems, e.g. for telephone-based applications, the widest variety of possibilities are available for verbal input and output. This ranges from the recognition of individually spoken numerals and a mostly limited number of command words to the possibility of the input of expressions spoken in a flowing manner. The output possibilities range from the output of completely recorded expressions to the purely synthetically generated acoustic output of texts from e.g. stored phonemes.

Applications of speech processing systems in the industrial, public and private sectors are confronted with very different demands both on speech input and also on speech output. This is due to the large number of application possibilities and the verbal tasks thereby to be solved by the speech processing systems.

This also holds for speech dialog systems in which the speech processing system stands in an arbitrarily constructed dialog with the user of the speech processing system.

Given an application in the area of speech processing systems, it can for example be required that at a particular time a numeral is interrogated individually by the user, while at another time within the same dialog a date can be inputted by the user, to be processed by the speech processing system.

Likewise, during output at one point the output of a stored speech segment may be sufficient, whereas at a different point of an application scenario a speech synthesis may be more suitable due to the high variability of the text to be outputted.

In addition, at different times different performance features of speech recognizers may be regarded as necessary by the operator; for example, the interruptibility of the system output may be desirable, whereas at a different point it may be desired that the user listen to the complete output.

There is a greater need for the most efficient possible application of the specialized known algorithms for speech recognition and speech output, and also speech dialog systems with more complex recognition characteristics and output characteristics than for example for simple numeral recognition or only for the isolated recognition of a small number of command words. In the prior art it was standard to create the systems in such a way that the specific requirements on speech recognition or, respectively, on speech output were taken into account by means of the particular selection of technical methods and specific software measures.

However, this requires a large expense in expert personnel, which as a rule must be furnished anew for each new situation of application. By means of this procedure, an efficient economical use of speech processing systems is hindered considerably.

In the area of telephony, there exist dialog systems in which a selection takes place e.g. via what are called DTMF tones and simple naming of numerals or of some less predetermined command words.

However, the expense for a new development of a speech processing system or, respectively, of a speech dialog system with the previous methods and systems is very expensive.

From the reference by Caspari, R., 1993, "Bottom Up Generation from Flat Semantic Structures," Proc. Deklarative und prozedurale Aspekte der Sprachverarbeitung, Deutsche Gesellschaft für Sprachverarbeitung, Sektion Computerlinguistik, $4^{th}$ Technical Conference, pp. 1-6, a method is known for improving speech recognition while taking into account various digital coding conditions. For a multiplicity of speech recognition modules that all use the same speech recognition algorithm, but adapted as optimally as possible to different channel coding methods for received signals, the channel coding method respectively used is recognized and the respectively corresponding speech recognition module is selected.

From Great Britain reference GB 2 119 208, a method and arrangement are known for generating a multiplicity of electrical signals. In this arrangement, a multiplicity of speech output units with identical construction are combined with one another to form the overall arrangement.

SUMMARY OF THE INVENTION

The invention is thus based on the problem of indicating a speech processing system and a method for speech processing with which an optimal context-sensitive use of speech recognition modules and/or speech output modules is achieved, with a reduction of the required computing capacity.

The speech processing system comprises several speech recognition modules and/or speech output modules that are respectively provided for a predeterminable type of speech recognition or, respectively, speech output. In addition, the speech processing system comprises a means for selecting a speech recognition module and/or speech output module. With this means, dependent on an input signal supplied to the means the respective speech recognition module or, respectively, speech output module is selected, activated, and the corresponding speech signal or, respectively, the required parameters are supplied to the respective module. The speech recognition or, respectively, the speech output is then executed by the respective module.

In the method, an input signal is analyzed with which it is described what type of speech recognition or, respectively, speech output is required. Dependent on the input signal, at least one speech recognition module and/or at least one speech output module is activated for the speech recognition or, respectively, speech output respectively described by the input signal. With the respectively selected or, respectively, activated module, the respective type of speech recognition or, respectively, speech output is carried out.

Both the speech processing system and the method comprise a number of considerable advantages in relation to the prior art.

The requirement for computing capacity or, respectively, processing resources for speech recognition or, respectively, for speech output is reduced considerably, since, dependent on the respectively required situation of application, the module that is optimally adapted for the situation is used for speech recognition or, respectively, for speech output.

The speech processing system can also be used to great advantage for developing a dialog system [sic]. This speech processing system offers particular advantages in this area because a rapid and simple adaptation of the existing technical speech recognition methods and speech output methods to the respective specific requirements of the situation of application is possible.

In addition, a flexible use of the various capacities and performance features thereof, adapted to the specific dialog situation, is achieved. A flexible adaptation of the speech recognition performance and speech output performance to the resources available for the users in the specific dialog system, e.g. to the available computer capacity, is also possible.

The speech processing system thus represents an important means for the configuration and adaptation according to need of speech input and speech output in the widest variety of situations of application.

In a development of the speech processing system, it is very advantageous to use particular algorithms, i.e. particular parts of the modules, in common, whereby a redundant realization of algorithms only actually required once is avoided.

It is also an advantageous development that several speech recognition modules use common resources, e.g. common lexicons for speech recognition. This leads to a considerable savings of resources, e.g. memory requirement.

In addition, it is advantageous to provide a dialog run control with which a dialog of the speech processing system with a user can be realized.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
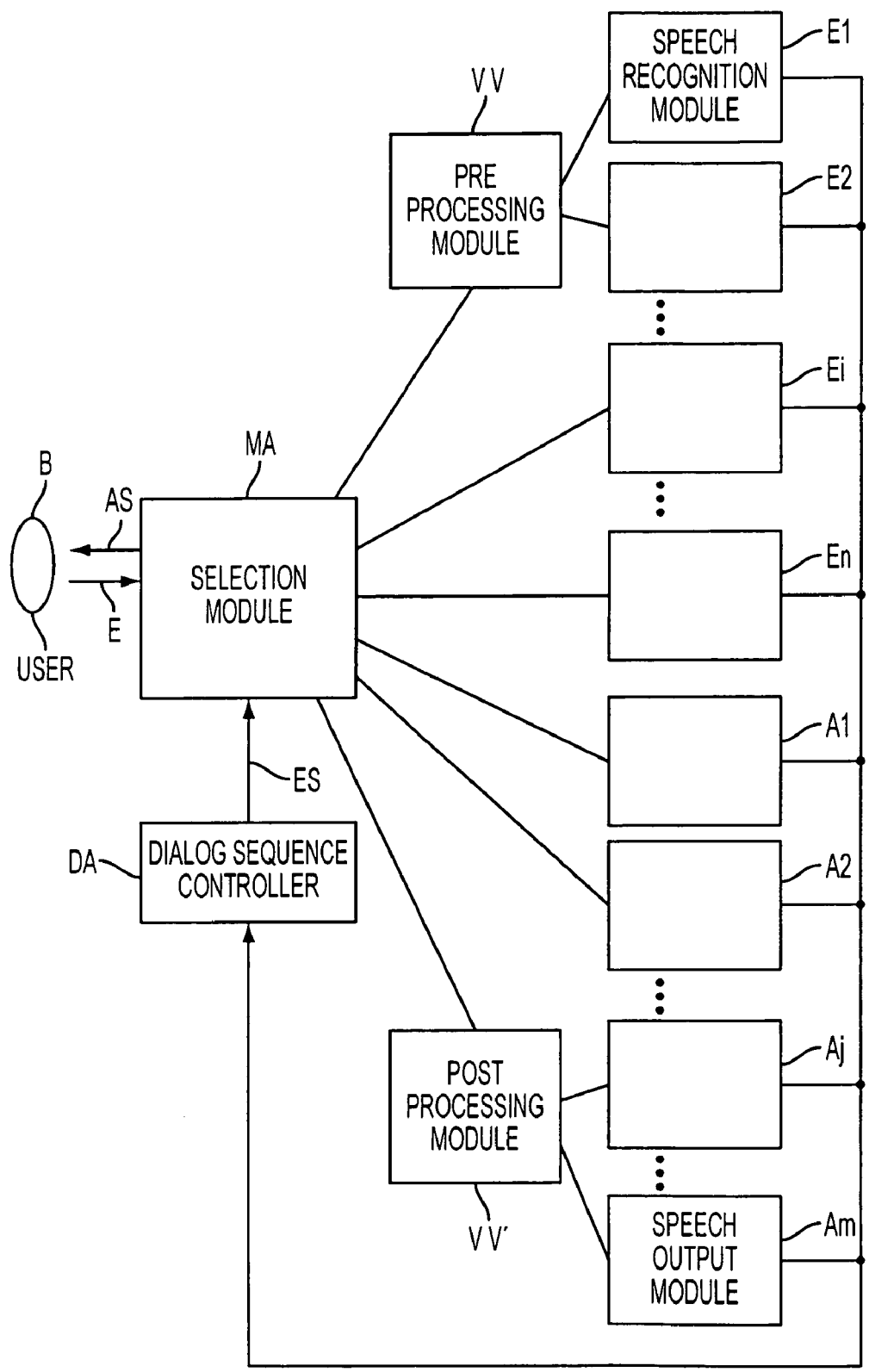
FIG. 1 shows the speech processing system with some developments.

FIG. 1 shows the speech processing system. The speech processing system comprises at least one speech recognition module E1, E2, Ei, . . . , En. An index i, an arbitrary number between 1 and n, unambiguously identifies the speech recognition module Ei. The letter n designates a number of speech recognition modules in the speech processing system.

In addition, the speech recognition system additionally or alternatively comprises at least one speech output module A1, A2, Aj, . . . , Am. A second index j, an arbitrary number between 1 and m, unambiguously identifies each speech output module Aj. A number of speech output modules in the speech processing system is designated m.

In addition, the speech processing system comprises a means MA for selecting the speech recognition modules Ei or, respectively, the speech output modules Aj. The means MA for selecting the modules is coupled with the individual modules Ei, Aj, so that signals can be sent by the means MA to the individual modules Ei, Aj for the selection of the modules Ei, Aj, e.g. for the activation of the individual modules Ei, Aj, or also for transferring parameters that are required by the individual modules for the execution of the speech recognition or of the speech output.

Speech Recognition Modules Ei

Fundamental concepts of speech recognition are described example in the reference by G. Ruske, "Automatische Spracherkennung, Oldenbourg-Verlag", 1$^{st}$ ed., ISBN 3-486-20877-2, Munich, pp. 106-171, 1988 and the reference by A. Zell, Simulation neuronal Netze, Edison Wesley, 1$^{st}$ ed., ISBN 3-89319-554-8, pp. 137-143, 1994.

The individual speech recognition modules E1, E2, . . . , En are modules that are respectively specialized for a particular type of speech recognition.

The individual speech recognition modules Ei can for example be realized by hardware or also by individual software procedures.

In the following, an overview is given (in no way to be regarded as final) of provided speech recognition modules Ei that can be used within the scope of the speech processing system.

Individual Numeral Recognizer

If a speech recognition module Ei is fashioned as an individual numeral recognizer, it is constructed so as to process as input a single speech signal spoken in by the user B of the speech processing system, which signal represents a single numeral from a selection of numerals. The individual numeral recognizers thereby standardly differ from one another in the modeling of the acoustic pattern. Systems are known in which the acoustic pattern of different speakers for an entire word must be stored, and, using comparison methods such as what is called dynamic programming or dynamic time warping, or also using neural networks, the best-fitting word is determined in the recognition process. Other known modules for individual numeral recognition are based on the principle of hidden Markov models. In this principle of individual numeral recognition, the sequence of sounds of the words spoken by several speakers are stored as a state sequence with variable and predetermined length. In the recognition of the words, in this case of the numeral, the smallest difference from the stored word sequence is determined. In variants of this principle, the sequences of the individual phonetic units are stored in hidden Markov models, said units being obtained from the data of several speakers, as a rule numerals. In order to reduce the required computing capacity, in an individual numeral recognizer the fact can be exploited that a further sequence cannot follow any of the stored phonetic sequences. For this reason, in this case a computing-intensive detection of word boundaries is not required. The vocabulary to be examined is also relatively small, since only the numerals need be examined.

Numeral Chain Recognizer

If a speech recognition module Ei is constructed as a numeral chain recognizer, as a rule the speech recognition module is to be equated with recognizers for continuous speech. A number of predeterminable words defined in a digital lexicon (numerals in this specific case) can be expressed in an arbitrary sequence one after the other by a user B of the speech processing system. For this case, a detection of the boundaries between the individual words is required. This can take place either by means of a method for the explicit detection of the word boundaries, or the word boundaries are defined by the word search algorithm. In the word search, all numerals in the input signal are examined in parallel, and various ends are hypothesized. At each end, a further numeral can be sought in the signal. For this purpose, a search space is constructed that pursues the various alternatives at the same time and orders them according to predeterminable criteria of quality. In this context, for example the principle of dynamic programming can be used, as described in the reference by G. Ruske, "Automatische Spracherkennung, Oldenbourg-Verlag", 1$^{st}$ ed., ISBN 3-486-20877-2, Munich, pp. 106-1.71, 1988. Such a criterion can be the difference of the observed parts of the signal from the reference patterns, the individually stored numerals. As a rule, numeral chain recognizers are distinguished from continuous recognizers by the particular type of modeling of the acoustic reference patterns, in which a specific manner of articulation or typical lengths of the individual numerals are exploited. By means of a modeling of pauses in speech or by means of a decision criterion, e.g. the energy visible in the signal, the end of such a sequence can be detected in various heuristics.

Recognition of Words from a Limited Vocabulary

If a speech recognition module Ei is constructed as a speech recognizer for particular frequent command words from a limited vocabulary, called the core vocabulary, then algorithmically the corresponding method is applied as is also applied for individual numeral recognition, but with the difference that the vocabulary is expanded by the corresponding words, or, respectively, that the vocabulary differs from the numerals with the corresponding stored representatives of the individual words. The specially expanded or, respectively, replaced vocabulary is predetermined for the speech recognizer and as a rule is trained with a larger number of speakers.

Recognition of an Individual Word from an Unlimited Vocabulary

For the recognition of speech spoken in a flowing manner with an unlimited vocabulary, a speech recognition module Ei is constructed in such a way that the words of the vocabulary are not known to the speech recognition algorithm that is realized in the speech recognition module Ei, but rather are determined beforehand by a user B. The algorithm for speech recognition is standardly based on the recognition of a sequence of phonetic units, called phonemes, or other word subunits from which the words of the vocabulary to be recognized can be composed. In the lexicon of the speech recognition module Ei, the phonetic sequences that identify the respective word are stored in a memory. In their modeling, the sounds can also comprise further subunits, such as for example the beginning of the phoneme, the middle of the phoneme, the end of the phoneme, the transition of the phoneme, etc. The speech recognition method in turn searches the observed speech signal for the sequence with the smallest difference from the reference data. The individual word recognizer can algorithmically exploit the circumstance that a further sequence cannot follow any of the phonetic sequences stored in the stock.

Recognition of Speech Spoken in a Flowing Manner with an Unlimited Vocabulary

If a speech recognition module Ei is constructed for the recognition of expressions of the user spoken in flowing fashion with an unlimited vocabulary, then as a rule the speech recognition module Ei differs from a speech recognition module Ei for numeral chain recognition in the type of modeling of the phonetic units. If the lexical inventory, i.e. the vocabulary, is unlimited, which is also designated an open lexical inventory, the acoustic modeling takes place mostly on phonetic units, the phonemes, or on word subunits from which the vocabulary to be recognized can be composed. As in the speech recognition module Ei for continuous numerals, in this construction of the speech recognition module the boundaries between the words are determined by a suitable search. This takes place for example by means of a modeling of speech pauses or by means of a decision criterion, e.g. the energy visible in the signal. The speech recognition module can output the most probable sequence of words, or, with expansions in the search algorithm, can output a predeterminable number of the most probable sequences of words. In continuous speech recognition modules, the search is mostly supported by a modeling of the word sequences that are typical or possible for a particular speech segment, called language models. Language models are to be understood for example as grammatical modellings of the word sequences or word lists, or statistical modellings in the sense of what is called an N-gram analysis.

Recognition of Predetermined Word Combinations

For the recognition of predetermined word combinations, a speech recognition module E1 is constructed in such a way that for example date indications, time indications, measure indications, count indications, etc., are used as a special vocabulary. These speech recognition modules Ei are standardly speech recognition modules Ei for continuous speech, whose lexical inventory is however tailored to the predetermined word combinations from the respective regions, such as for example a date indication or a measure indication. In addition, the word sequence search can be supported by a modeling of the possible word sequences, as in a continuous speech recognition module Ei, whereby this modeling is distinguished in that it essentially takes into particular account the ways of expression that are to be expected in one of these verbal subregions, e.g. date indications.

Keyword Recognition

In a speech recognition module Ei for keyword recognition, one or several predetermined words previously stored in a lexicon can be detected in a speech input signal. The various possibilities for constructing the speech recognition module for keyword recognition are described for example in the reference by Naumann, Sven and Hagen Langer, 1994: Parsing, Stuttgart, Teubner, $1^{st}$ ed., ISBN 3-519-02139-0, pp. 155-1666.

Recognition of Keyword Combinations

For the recognition of keyword combinations, the same principle is used as for the recognition of keywords, with the difference that pre-defined word chains can be detected in an arbitrary input signal ES. The word chains can be stored either explicitly as reference data or can be described by other methods, for example language models or grammars.

Alphabet Recognition

If a speech recognition module Ei is constructed as an alphabet recognition means, the letters are standardly described with particular acoustic phonetic models. In this case, the letters of the alphabet are essentially used as lexical units that are provided in a memory of the speech processing system. An alphabet recognizer can for example be realized as an individual word recognizer for the isolated alphabet or also as a continuous recognizer for a flowing spelling. In continuous alphabet recognizers, the search for the actual word sequences can be supported by language models or also by grammars.

Phonetic Sequence Recognition

A speech recognition module Ei for phonetic sequence recognition is distinguished in that the acoustic units are modeled on phonetic units, and the phonetic sequences to be recognized are not limited by a lexicon. Phonetic sequence recognizers or, respectively, phoneme recognizers are based on acoustic-phonetic modellings of the sounds of a language. The search in the acoustic speech signal is carried out with the phonetic inventory. An arbitrary chain of sounds is hypothesized. In the acoustic analysis, various heuristics are used in order to prevent a too-rapid exchange of the hypothesized sounds, the phonemes, in an expression. In addition, phonetic regularities of a language can be taken into account as limitations of the sound sequences to be recognized, in the sense of language models.

DTMF Recognition

A DTMF recognition is known from the widest variety of telephonic speech recognition.

As a speech output module Aj, various known principles can be used for the realization of various speech output principles:

Output of Predetermined Stored Speech Stocks

If a speech output module Aj is constructed for the output of predetermined stored speech stocks, speech expressions previously spoken by an arbitrary person, recorded and stored in digitized form, are outputted via an arbitrary acoustic channel. The recorded expressions can hereby be the complete expressions to be outputted that are respectively provided for a particular situation, or else also fragments thereof that are put together during runtime to form complete expressions. A typical example of this is the formation of chains of numerals, whose length and composition cannot in most cases be foreseen. However, various intonational variants of one and the same expression may also be present according to context, and can be selected in a software program corresponding to the current context. In addition, various methods can be used that can carry out what is called an acoustic smoothing of the stocks used at the transitions of the concatenation of the individual speech stocks in the most various form.

Output of Words Synthesized from Stored Phonemes

Possible realizations for the construction of speech output modules for the synthesis of stored phonemes to form synthesized words are described German reference DE 44 12 309 A1.

The means MA for the selection of the speech recognition modules Ei or, respectively, speech output modules Aj respectively to be used in an application scenario is constructed in such a way that, dependent on an input signal ES supplied to the means MA, at least one of the speech recognition modules or, respectively, of the speech output modules is activated, and, insofar as is required, parameters required in the further method for speech recognition or, respectively, for speech output are supplied to the individual speech recognition modules Ei or, respectively, speech output modules Aj. The corresponding parameters can for example be that resources are assigned to the speech recognition modules Ei or, respectively, to the speech output modules Aj, or also for example that the memory addresses of the digital lexicons used are supplied to the speech recognition modules Ei or, respectively, to the speech output modules Aj.

In this embodiment, the results, i.e. the outputted speech signals from the speech output modules Aj, are supplied to the means MA, and are outputted to the user B via for example an output AS of the speech processing system. A speech signal spoken by a user B is supplied to the means MA via an input E, for example realized by a microphone, and is supplied to the respectively activated speech recognition module Ei via the means MA, dependent on the respectively activated speech recognition modules Ei.

The individual modules Ei, Aj use, among other things, knowledge sources, e.g. digital lexicons, general data stored in a memory of the speech processing system. The knowledge sources are for example also to be understood as including for example acoustic models specialized to the respective speech recognition task, e.g. an individual word recognizer with sound models or individual word recognizer with acoustic models for arbitrary words. However, the knowledge sources can also be the specific vocabularies available for selection by the recognizers for a given dialog step in a dialog system, or for particular, expected input-specific speech models, as they are known.

The vocabulary used by the speech recognition modules Ei is arbitrarily expandable by means of orthographic, i.e. speaker-independent, or verbal, i.e. speaker-dependent, input, both in production and also currently during the runtime of the speech processing system by means of an evaluation of the running input data, and is thus adaptable to changing demands.

By means of suitable learning methods, the knowledge sources can be modified during the operation of the speech processing system, and can be adapted to the particular situation of use and application.

In addition, a parameter that is supplied to the speech recognition modules Ei or to the speech output modules Aj can be that the parameter indicates whether speech signals spoken by the user B can be processed during a speech output itself and recorded by the speech processing system.

In the following, a construction of the speech processing system as a speech dialog system is shown, on the basis of a very simple example for a dialog situation.

In the following representation, in a pseudo-message flow diagram, at the beginning of a row on the left side of an arrow the sender of a particular signal is respectively described, and on the right side of an arrow the receiver of the signal that is further indicated in this row is respectively described.

In this example, a development that is described later, namely a dialog sequence control DA, is assumed, without limitation of generality.

| | |
|---|---|
| DA→MA: | Output ("Please state your number after the tone") |
| MA→A1: | PlayPromptFile (Please_state_your_number_after_the_tone) |
| A1→MA: | PlayPromptFinished |
| MA→DA: | OutputComplete |
| DA→MA: | RecognizeExpression (Domain = Numerals, Number max. = 5) |
| MA→E1: | BeginRecognition (Mode = Individual numeral, Lexicon = Digits) |
| MA→E2: | BeginRecognition (Mode = Continuous numeral recognition, Lexicon = Digits) |
| E1→MA: | RecognizeOutput (Mode = Individual numeral, Result = 0) |
| E2→MA: | RecognizeOutput (Mode = continuous numerals, recognized numeral sequence: 1 2 3 4 5) |
| MA→DA: | InputNumeralSequence: (1 2 3 4 5) |
| DA→MA: | Output ("Your number is 1 2 3 4 5") |
| DA→A1: | PlayPromptFile (Your_number_is) |
| MA→A2: | Synthesize (NumeralSequence 1 2 3 4 5) |
| A1→MA: | PlayPromptFinished |
| A2→MA: | Synthesize Finished |
| MA→DA: | OutputComplete |
| DA→MA: | Output ("Do you wish to speak with sales or with customer service?") |
| MA→A1: | PlayPromptFile ("Do_you_wish_to_speak_with_sales_or_with_customer_service) |
| A1→MA: | Prompt file not available |
| MA→A2: | Synthesize (Do you wish to speak with sales or with customer service?) |
| A2→MA: | Synthesis finished |
| MA→DA: | Output complete |
| DA→DM: | RecognizeSpeech (Domain = Sales_or_customer_service) |
| MA→E3: | BeginRecognition (Mode = continuous, Lexicon = Core vocabulary) |
| DM→E4: | BeginRecognition (Mode = keyword recognition, Lexicon = sales and customer service) |
| E3→MA: | RecognizerOutput (Mode = continuous, Result = "sales, please") |
| E4→MA: | RecognizerOutput (Mode = keyword recognition, result = "sales") |
| MA→DA: | InputCharacterSequence (sales) |
| DA→MA: | Output ("Your_date_of_birth_please") |
| MA"A1: | PlayPromptFile (Your_date_of_birth_please) |
| DA→MA: | RecognizeExpression (Domain = Date) |
| DM→E5: | BeginRecognition (Mode = continuous, Lexicon = date indication) |
| E5→MA: | RecognizeOutput (Mode = Continuous, Result 1 = "January |

-continued

| | |
|---|---|
| | first, nineteen-fifty," Result 2 = "November first, nineteen-fifty") |
| MA→DA: | InputCharacterSequence (January first nineteen-fifty) |
| DA→MA: | Output ("You were born on January first, nineteen-fifty") |
| MA→A3: | ConcatOutput (You_were_born_on January first, nineteen- fifty) |
| A3→MA: | PlayPromptConcatComplete |
| MA→DA: | OutputComplete |
| DA→MA: | RecognizeSpeech (Domain = y/n question) |
| MA→E6: | BeginRecognition (mode = individual word, lexicon = (yes, no)) |

In this simple example, the speech recognition modules Ei comprise the following simple speech recognition characteristics:

The speech recognition module E1 is constructed as an individual numeral recognizer, E2 is constructed as a speech recognition module for the recognition of continuous numerals, i.e. chains of numerals. The speech recognition module E3 is constructed as a speech recognition module for the recognition of speech spoken in a flowing manner with a limited vocabulary, the lexicon "core vocabulary." The speech recognition module E4 is constructed as a keyword recognizer with the lexicon "sales and customer service," and the speech recognition module E5 is constructed as a speech recognition module for recognizing predetermined word combinations; in this specific case it is constructed for the recognition of a date indication.

In this simple example, the speech output modules Aj used are constructed as a module for the output of predetermined, stored speech stores (A1), a module for synthesizing speech from for example phonemes (A2), and a module for outputting compositions of individually predetermined stored speech stores (A3).

As can be seen from this simple example, the results of the speech recognition are supplied to the means MA by the speech recognition modules Ei, or, respectively, the speech signal to be outputted is supplied to the means MA by the speech output modules Aj.

On the other hand, the respective information required for the recognition is supplied to the individual modules Ei, Aj by the means MA, e.g. also the speech signal uttered into the speech processing system.

A further development of the speech processing system and of the method for speech processing is that the speech signal is also simultaneously processed by several speech recognition modules Ei or speech output modules Aj, and that the respective best result with respect to an arbitrary similarity criterion is applied, or also only one result is applied in order to increase recognition security.

Dialog Sequence Control

With the dialog sequence control DA, a predeterminable dialog is carried out with the user B of the speech processing system according to the situation of application, and, dependent on the respective dialog situation, control information, e.g. information still required, is supplied to the means MA. In addition, in this development for example the result of the speech recognition modules is evaluated in the means for dialog sequence control, which can for example take place in the following manner:

The dialog sequence control DA comprises at least the following components that are coupled with one another, e.g. via a bus BU (see FIG. 2):

an input means EM, an input memory ESP, an action determination unit AE, a parameter parser PP.

The manner of operation of the individual components of the dialog sequence control DA will be explained in more detail below in connection with the methods for sequence control of a dialog with the user B.

The action determination unit AE serves on the one hand for the determination of action indications and on the other hand for the determination of at least one predeterminable action that is indicated by the action indication. The action is determined from an arbitrary number of predeterminable actions. Various ways of proceeding for the determination of the action sought, which action is indicated by the action indication, are known to those skilled in the art. However, some possibilities, presented as examples, for the realization thereof will be explained in detail in connection with the method.

The parameter parser PP serves for the determination of action parameters that are respectively allocated unambiguously to each action, from the digital action information stored in the input memory ESP.

Figure 2:
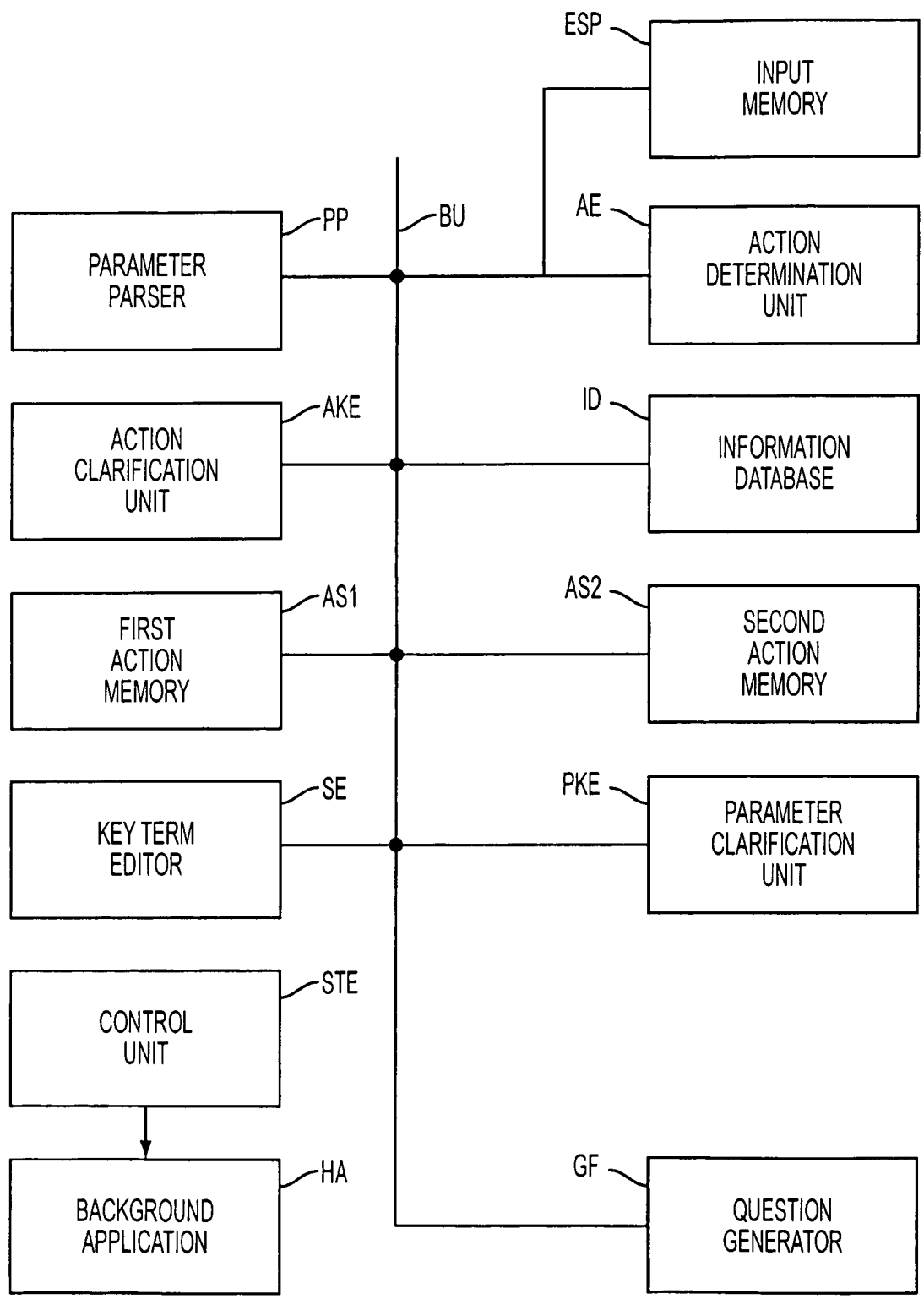
FIG. 2 shows a block diagram in which the dialog sequence control system is shown.

In FIG. 2, the dialog sequence control DA is represented with some developments of the dialog sequence control DA for action determination.

An information database ID provided in a construction respectively contains sought application-specific information that is determined on the basis of the determined action and the action parameters subsequently determined for the action.

In a development, an action clarification unit AKE is provided for the determination of further action indications by the user. Above all, the action clarification unit AKE is of increased importance in areas of application where it is important to determine the sought action among various actions. If the action indications handed over to the dialog sequence control DA by the user B are not sufficient for the determination of the action, the action clarification unit AKE is applied for the determination of further action indications by the user B. The construction of the action clarification unit AKE is explained in more detail in connection with the method. However, it is not necessary that the action clarification unit AKE determine exactly one action. It is likewise provided to reduce the number of predetermined actions in an arbitrary manner, in order in this way to further process only a smaller number of actions.

In a development, a parameter clarification unit PKE is provided for the determination of further action parameters by the user B. The parameter clarification unit PKE is applied if for the at least one determined action not all action parameters allocated to the respective actions can be determined. For this case it is advantageous that the parameter clarification unit PKE is applied in order to determine missing action parameters from the user B.

In a development of the dialog sequence control DA, it is additionally advantageous to provide a first action memory AS1 and/or a second action memory AS2. In the first action memory AS1, actions and their action parameters are stored in which the at least one action indication agrees completely with at least one part of key terms whose meaning is described below. In the second action memory AS2, actions and the action parameters thereof are stored in which at least one of the action indications agrees with at least one key term.

In addition, in a development a means GF is provided for the generation of questions (prompts) to the user B for the determination of further action indications and/or further action parameters. The design of the means GF for generating questions is known for example from the reference by Caspari, R., 1993, "Bottom Up Generation from Flat Semantic Structures", Proc. Deklarative und prozedurale Aspekte der Sprachverarbeitung, Deutsche Gesellschaft für Sprachverarbeitung, Sektion Computerlinguistik, $4^{th}$ Technical Conference, pp. 1-6.

In addition, in a development of the dialog sequence control DA it is provided to use a control unit STE for controlling a background application HA using the determined information. The construction of the control unit STE is completely application-specific, and serves only to apply the determined action for the controlling of the background application HA. The various possibilities of use, and thus also the various constructions of the control unit STE, are described in detail below.

In addition, in a development a key term editor SE is provided with which on the one hand the key terms designed below, and on the other hand new actions and/or action parameters, can be modified, removed, or added.

Figure 3:
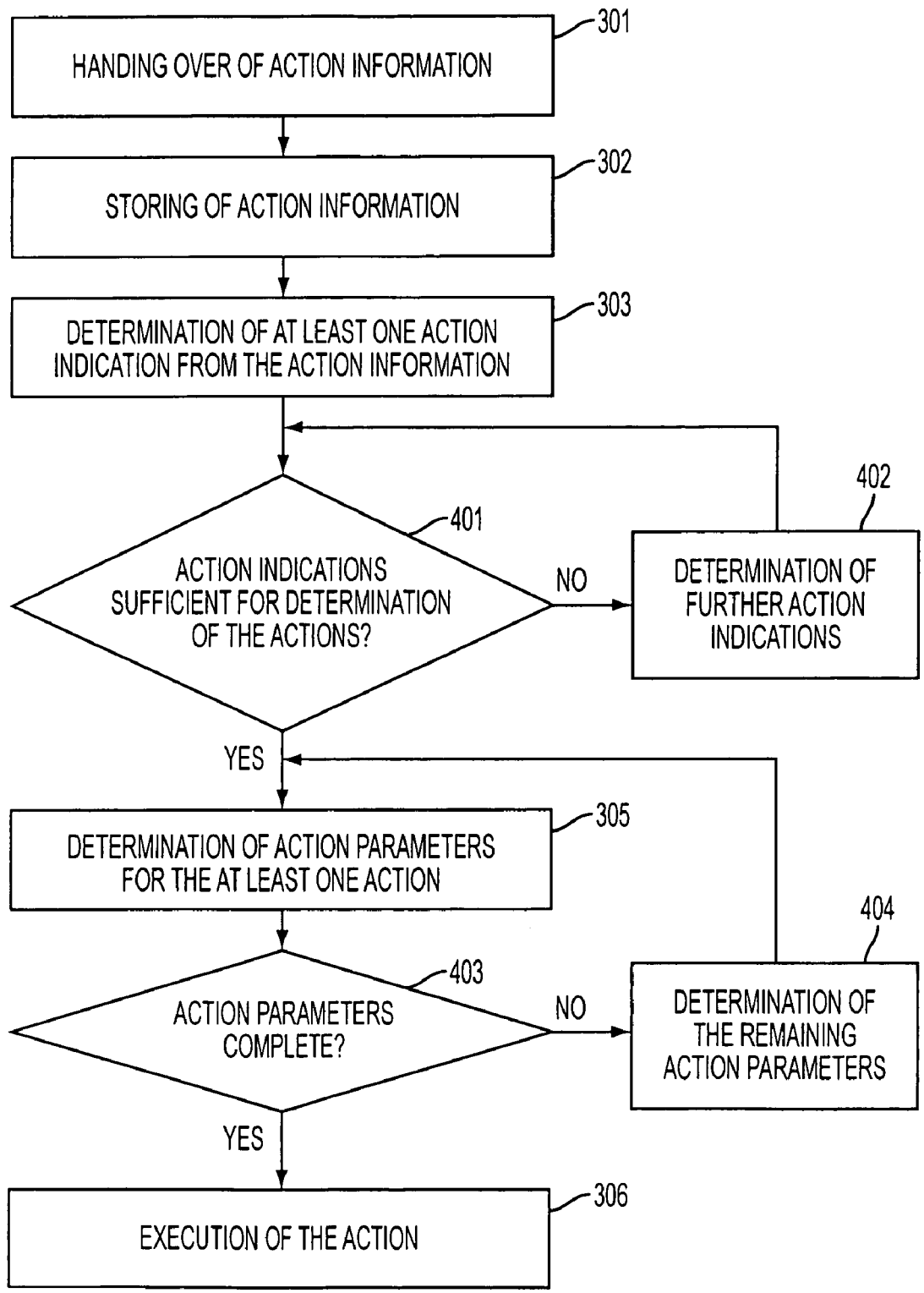
FIG. 3 shows a flow diagram in which a possible method executed for dialog sequence control is shown.

The individual steps of the method are shown in FIG. 3.

In a first step 301, action information comprising at least one action indication is handed over by the user B of the dialog sequence control DA. The method need not necessarily be carried out with the application described above; it is also possible to execute the method with the aid of a computer.

The action information is handed over by the user B to the dialog sequence control DA or to the speech processing system. The action information is digitized and stored as digitized action information 302. The digital action information can for example be stored in a phoneme representation or also in the form of a standard code for the representation of written characters (e.g. ASCII code).

In a further step 303, at least one action indication is determined from the stored action information using the parameter parser PP, whose design is known for example from the reference by Naumann, Sven and Hagen Langer, 1994: Parsing, Stuttgart, Teubner, $1^{st}$ ed., ISBN 3-519-02139-0, pp. 155-166.

Using the action indication and the action determination unit AE, at least one action is determined 304.

The determination of the at least one action can take place in various ways. One very simple, but in no way exclusively usable, method is to allocate to each action a predeterminable number of key terms that respectively characterize the action, and to compare the action indications determined from the action information, determined by the parameter parser PP, with the key terms. The comparison can take place by means of a direct word comparison or also by means of an arbitrary pattern comparison whose algorithms are familiar to anyone skilled in the art.

If the at least one action has been determined 304, then for all actions the action parameters that are unambiguously allocated to the actions are determined from the digital action information using the parameter parser PP 305. On the basis of the determined action, as well as of the associated action parameters, the action is now carried out in a final step 306.

In a development of the method, information concerning the action is determined from the information database ID, and is represented to the user B via the output unit AUS.

If the action indications contained in the digital action information are not sufficient for the determination of at least one action 401, it is provided in a development to determine further action indications for example by means of a dialog with the user B 402.

This takes place for example using the action clarification units AKE, which is are preferably constructed in such a way that for the predetermined actions at least one determination prompt is respectively unambiguously allocated. The determination prompt is to be understood for example as questions that are allocated to the respective action and are fixedly stored. These determination prompts are represented to the user B in the case of insufficient information for the determination of the actions. The user B gives responses to these determination prompts, i.e. to the corresponding questions, which responses are then in turn processed, whereby further action indications are determined. The dialog is carried out and repeated until the determined action indications and further action indications are sufficient for the identification of the predeterminable number of actions.

If the at least one action is determined, then for each action the action parameters allocated to the respective action are determined 305.

If, however, not all required action parameters are completely known or have been completely determined from the digital action information determined in the input memory ESP, which is checked in an additional method step 403, then the remaining action parameters are for example determined by the parameter clarification unit PKE 404.

This also takes place for example in a dialog with the user B. For this dialog, prompts allocated to the individual parameters, called parameter prompts in the following, can in turn be used, which, given the necessary determination of the corresponding action parameters, can be outputted to the user B, and the user B responds to the corresponding questions.

Both the determination of further action indications 402 and also the determination of the remaining action parameters 404 can however also take place in a different way.

For example, it is not absolutely necessary to allocate fixedly predetermined determination prompts or parameter prompts to the individual actions or, respectively, parameters, whereby on the one hand the simplicity in the execution of the method and in the adaptation of the respective application and the expandability of the actions and parameters is indeed considerably simplified, but the user B is always given only fixedly predetermined questions.

In a development of the method and of the dialog sequence control DA, it is provided to use the means GF for the generation of questions to the user B. A possibility for the realization of the means GF is for example described in the reference by Caspari, R., 1993, Bottom Up Generation from Flat Semantic Structures, Proc. Deklarative und prozedurale Aspekte der Sprachverarbeitung, Deutsche Gesellschaft für Sprachverarbeitung, Sektion Computerlinguistik, $4^{th}$ Technical Conference, pp. 1-6.

In a development of the method, it is provided to execute the following steps for the determination of the action in the action determination unit AE. In the action determination unit AE, for each action the comparison of the key terms with the action indications is carried out.

A first set of actions is determined in which all action indications agree with at least a part of the key terms. Graphically described, this procedure means that the intersection of all actions indicated by the action indications is determined. The first set of actions is for example stored in the first action memory AS1.

In addition, a second set of actions is formed in which at least one part of the action indications agrees with the key terms. This procedure means, graphically, a formation of the union of all actions indicated. The second set of actions is for example stored in the second action memory AS2.

If the first set contains exactly one element, the action to be determined is identified unambiguously. For this case, no further clarification dialog is required. If, however, the first set contains more elements than the number of actions to be determined, the action is not specified precisely enough by the initial user input. In this case, it is advantageous to execute the clarification dialog described above.

If the first set is an empty set, the initial user expression contains indications of disjoint actions. In this case, the clarification dialog is advantageously controlled by the actions contained in the second set.

If both the first set and also the second set are empty sets, then for example a clarification dialog is carried out for distinguishing all actions known in the application.

Thus, the first set and the second set in this development serve as a foundation for the dialog with the user B for the determination of the at least one action.

In a development of the method, the determined action can advantageously be used for the controlling of at least one background application HA.

The background application HA is to be understood as the widest variety of possibilities of use of the method and of the dialog sequence control DA, which are explained below.

The method and the dialog sequence control DA can for example advantageously be used in the following areas:
  in a telephone service,
  in a telepurchasing system and/or telebanking system,
  in what is known as a voice mail handling system,
  for controlling an arbitrary machine, e.g. a machine tool or a robot,
  for controlling a computer,
  in a messaging system of a branch exchange of a telecommunication system.

In addition, in a development of the method it is advantageous that the evaluation of the digital action information that is stored in the input memory ESP is determined by the parameter parser PP in a sequence that is inverted in relation to the input of the action information.

This means that the evaluation of the action information at the conclusion of the action information is begun and is continued until the beginning of the action information. By means of this procedure, a correaction of the action information by the user B is possible in a sentence, which is explained in more detail below.

For easier understanding of the dialog sequence control DA, in the following a very simple example from the area of tourism is presented. For example, in this area of application the following actions are defined:
  Information about train connections;
  Information about flight connections;
  Information about boat connections;
  Information about hotel rooms;
  Restaurant information.

The individual actions can for example be characterized by the following parameters:
  Train information: <departure location>, <arrival location>, <date>, <time>
  Flight information: <departure location>, <arrival location>, <date>, <time>
  Boat information: <departure location>, <arrival location>, <date>, <time>
  Hotel information: <location>, <room>, <type>, <number of persons>, <check-in date>, <check-out date>
  Restaurant information: <location>, <style>, <category>.

In the following, the individual actions are specified in the form of a pseudo-code. A number is hereby respectively unambiguously assigned under point 2.1 to the action, under point 2.2 to the respective determination prompt and under number 2.3 to the individual parameter specifications, which, dependent respectively on the defined grammar in this case for predetermined parameter prompts, are represented in such a way that the respective grammar of the respective action parameter is respectively given under point 3.1 and point 3.3, and under point 3.2 the respective parameter prompt is shown.

action (train information)

```
{2.1: number = 1
2.2: determination prompt = 'Would you like to request train information?'
2.3: Parameter specifications = {parameter
        {3.1: g_departure (X)
            3.2: 'Please state the desired departure location.'
            3.3: g_location (X)
        }
        parameter
        {3.1: g_information (Y)
            3.2: 'Please state the desired arrival location.'
            3.3: g_location (Y)
        }
        parameter
        {3.1: g_date (Z)
            3.2: 'On which date do you wish to travel?'
            3.3: g_date (Z)
        }
        parameter
        {3.1: g_time (W)
            3.2: 'At what time do you wish to travel?'
            3.3: g_time (W)
        }
}
2.4: Action indications = {from, to, travel, train information, railway, railway information}
2.5: Confirmation prompt =
        'You are receiving information about trains from X to Y on Z at W o'clock.'
}
action (flight information)
    {2.1: Number = 2
    2.2: Determination prompt = 'Would you like to request flight information?'
    2.3: Parameter specifications = {parameter
        {3.1: g_departure (X)
            3.2: 'Please state the desired departure location.'
            3.3: g_location (X)
        }
        parameter
        {3.1: g_information (Y)
            3.2: 'Please state the desired arrival location.'
            3.3: g_location (Y)
        }
        parameter
        {3.1: g_date (Z)
            3.2: 'On which date do you wish to fly?'
            3.3: g_date (Z)
        }
        parameter
        {3.1: g_time (W)
            3.2: 'At what time do you wish to fly?'
            3.3: g_time (W)
        }
    }
2.4: Action indications = {from, to, travel, fly, flight information, aircraft}
2.5: Confirmation prompt =
        'You are receiving information about
```

-continued

```
flights from X to Y on Z at W o'clock.'
}
Action (Boat information)
    {2.1: Number = 3
    2.2: Determination prompt = 'Would you like to receive
boat information?'
    2.3: Parameter specifications = {parameter
            {3.1: g_departure (X)
            3.2: 'Please state the
desired departure location.'
            3.3: g_location (X)
            }
            parameter
            {3.1: g_information (Y)
            3.2: 'Please state
the desired arrival location."
            3.3: g_location (Y)
            }
            parameter
            {3.1: g_date (Z)
            3.2: 'On which date do
you wish to travel?'
            3.3: g_date (Z)
            }
            parameter
            {3.1: g_time (W)
            3.2: 'At what time do
you wish to travel?'
            3.3: g_time (W)
            }
    }
    2.4: Action indication = {from, to, travel, boat information,
boat}
    2.5: Confirmation prompt =
            'You are receiving information about the boat
connections from X to Y on Z at W o'clock.'
}
Action (Hotel information)
    {2.1: Number = 4
    2.2: Determination prompt = 'Would you like to request
hotel information?'
    2.3: Parameter specifications = {parameter
            {3.1: g_location indication (X)
            3.2: 'In what location are you
looking for a hotel?'
            3.3: g_location indication (X)
            }
            parameter
            {g_type of room (Y)
            3.2: 'Are you looking for a
single room or a double room?'
            3.3: g_type of room (Y)
            }
            parameter
            {3.1: g_number of persons (Z)
            3.2: 'For how many persons are
you looking for a room?'
            3.3: g_number of persons (Z)
            }
            parameter
            {3.1: g_from_date (W)
            3.2: 'When do you wish to check
in?'
            3.3: g_date (W)
            }
            parameter
            {3.1: g_to_date (V)
            3.2: 'When do you wish to check
out?'
            3.3: g_date (V)
            }
    }
    2.4: Type of action = {Hotel, accommodation, single room,
double room, room}
    2.5: Confirmation prompt =
            'You are receiving information about hotels in X that
have Y available for Z persons from W to V.'
}
Action (Restaurant information)
    {2.1: number = 5
    2.2: Determination prompt = 'Would you like to request
restaurant information?'
    2.3: Parameter specifications = {parameter
            {3.1: g_location indication (X)
            3.2: 'In which
location do you wish to dine?'
            3.3: g_location (X)
            }
            parameter
            {3.1: g_style (Y)
            3.2: 'Please state the desired
style.'
            3.3: g_style (Y)
            }
            parameter
            {3.1: g_category (Z)
            3.2: 'Please state the desired
category.'
            3.3: g_category (Z)
            }
    }
    2.4: Action indication = {Restaurant, dine}
    2.5: Confirmation prompt =
            'You are receiving information about Y restaurants
of category Z in X.'
}
```

The following table shows examples of key terms for the individual actions that are unambiguously identified by the corresponding number in the curved brackets.

| | |
|---|---|
| from | {1, 2, 3} |
| to | {1, 2, 3} |
| travel | {1, 2, 3} |
| train information | {1} |
| railway | {1} |
| fly | {2} |
| flight information | {2} |
| aircraft | {2} |
| boat information | {3} |
| boat | {3} |
| hotel | {4} |
| accommodations | {5} |
| single room | {4} |
| double room | {4} |
| restaurant | {5} |
| dine | {5} |

An example of a dialog of the user B with the dialog sequence control DA is presented in the following.

The user B expresses his desire in a precise and complete manner.

The user B inputs the following information:

"I would like to travel by train from Munich to Hamburg on Jan. 1, 1996 at 5:00."

The first action memory AS1 contains the first set of actions {1} using the above-described key terms and grammars. The second action memory AS2 contains the second set of actions {1, 2, 3}.

Since the first action memory AS1 comprises exactly one element, the sought information is determined directly by the dialog sequence control DA from the information database ID, and is for example represented to the user B by means of the following response:

"You are receiving information about the flights [sic] from Munich to Hamburg at 5:00 on Jan. 1, 1996: $1^{st}$ flight, $2^{nd}$ flight, $3^{rd}$ flight, etc."

In a further example, the user B states neither the time nor the means of transportation:

The action information is for example the following:

"I would like to travel from Munich to Hamburg on Jan. 1, 1996."

In this case, the first action memory AS1 contains the first set of actions {1, 2, 3}. The second action memory AS2 contains the second set of actions {1, 2, 3}. In the dialog sequence control DA, a clarification dialog is initiated in order to distinguish between the actions {1, 2, 3}.

For this purpose, the above-described determination prompt:

"Would you like railway information?"

is outputted to the user B.

The user B responds for example with "No."

In this case, the following determination prompt is for example outputted by the dialog sequence control DA:
"Would you like flight information?"

If the user B answers "yes" to this question, a further clarification dialog is carried out in order to determine the remaining still-missing action parameters for the flight information. The parameter prompt:

"At what time do you wish to fly?"

is hereby for example outputted to the user B for the determination of the action parameter time.

The user B responds e.g.:

"At five o'clock."

The dialog sequence control DA now has sufficient information to determine the sought action. The result is for example represented to the user B in the following manner:

"You are receiving information about the flights from Munich to Hamburg on Jan. 1, 1996 at five o'clock."

Further details concerning a possible construction of the dialog sequence control DA are described in the German patent application with official file number 19615693.9.

Figure 4:
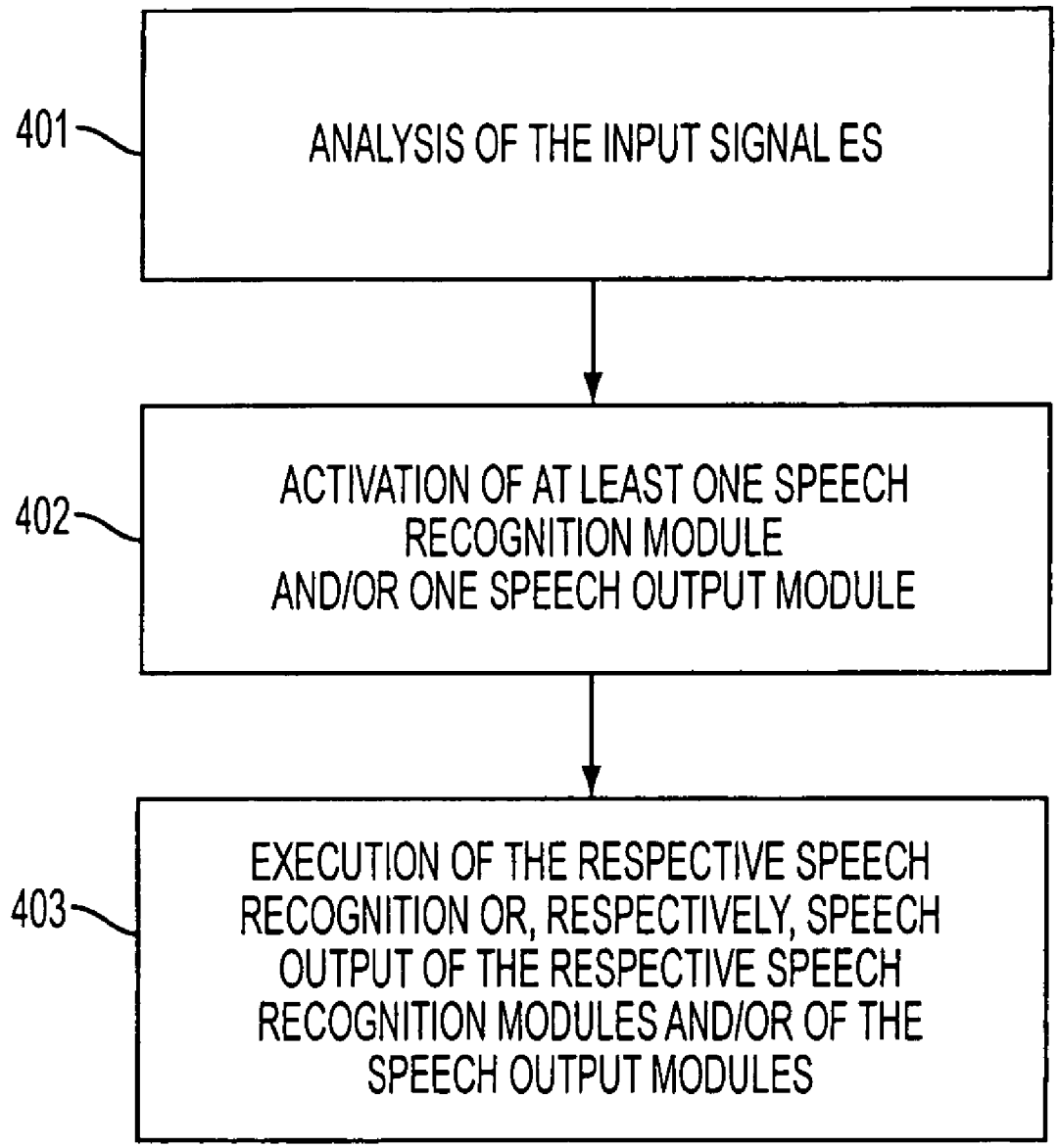
FIG. 4 shows a flow diagram in which the inventive method is represented.

FIG. 4 shows, in a flow diagram, the method in its method steps. The input signal ES is analyzed, whereby the input signal ES describes what type of speech recognition and/or what type of speech output is required in the rest of the method 401.

In addition, dependent on the input signal ES at least one speech recognition module Ei and/or one speech output module Aj are activated 402.

In a final step 403, the respective speech recognition or, respectively, speech output is carried out in at least one of the speech recognition modules and/or speech output modules.

In addition, in a development it is provided to carry out, in a separate pre-processing module VV, all pre-processing steps or also all parts of algorithms that are simultaneously used in common in different methods for speech recognition.

In the common pre-processing, for example in at least one pre-processing module VV, it is for example possible to realize an acoustic pre-processing or what is known as a difference calculation of the examined parts of the speech signal.

In addition, in a development it is advantageous to use resources in common, for example in such a way that a lexicon of several speech recognition modules Ei is used in common. This is for example possible in that a lexicon for the recognition of speech spoken in a flowing manner contains among other things the words "yes" and "no," whereby it is possible that in this case a keyword recognizer (keyword spotter) can also access the terms "yes" and "no" in the same lexicon for the execution of the speech recognition.

A common use of the resources in the post-processing is also provided as a construction both in the method and also with a post-processing module VV in the speech processing system.

Both the speech processing system and the method for speech processing can be applied to great advantage both in speech recognition and in speech output as well as in the carrying out of a dialog with a user B, and also for the production of speech dialog systems, since a very simple combination of the application-specific combinations of speech recognition modules and/or speech output modules is possible.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

The following publications were cited in this document:

[1] G. Ruske, Automatische Spracherkennung, Oldenbourg-Verlag, 1$^{st}$ ed., ISBN 3-486-20877-2, Munich, pp. 106-171, 1988.

[2] A. Zell, Simulation neuronal Netze, Edison Wesley, 1$^{st}$ ed., ISBN 3-89319-554-8, pp. 137-143, 1994.

[3] Caspari, R., 1993, Bottom Up Generation from Flat Semantic Structures, Proc. Deklarative und prozedurale Aspekte der Sprachverarbeitung, Deutsche Gesellschaft für Sprachverarbeitung, Sektion Computerlinguistik, 4$^{th}$ Technical Conference, pp. 1-6.

[4] Naumann, Sven and Hagen Langer, 1994: Parsing, Stuttgart, Teubner, 1$^{st}$ ed., ISBN 3-519-02139-0, pp. 155-166.

[5] DE 44 12 309 A1

[6] GB 2 119 208 A

What is claimed is:

1. A speech processing system comprising:
    a plurality of modules of respectively different types, said plurality of modules comprising a plurality of speech recognition modules for respectively different types of speech recognition and a plurality of speech output modules for respectively different types of speech output, each speech output module being capable of outputting oral speech, each of the speech recognition modules and each of the speech output modules being respectively constructed specifically for a different type of speech recognition or speech output; and
    a selector supplied with an input signal containing information identifying a type needed to process said input signal, said type relating to type of speech recognition and said type of speech output needed to process said input signal, said selector being connected to said plurality of modules and routing said input signal to one of said modules while excluding said input signal from another of said modules, the selector routing said signal based on the type identified in said input signal for processing said input signal only in said one of said modules to which said input signal is routed.

2. A speech processing system as claimed in claim 1 wherein said selector controls processing of said input signal in said one of said modules to which said input signal is routed.

3. A speech processing system as claimed in claim 1 wherein a group of said speech recognition modules in said plurality of speech recognition modules share common pre-processing features, and wherein said plurality of modules further includes a pre-processing module, connected to said speech recognition modules in said group, and wherein said selector, if said at of said modules to which said input signal is routed is a speech recognition module in said group, routes said input signal to said one of said speech recognition modules in said group through said pre-processing module.

4. A speech processing system as claimed in claim 1 wherein a group of said speech output module in said plurality of speech output modules share common post-processing features, and wherein said plurality of modules further includes a post-processing module, connected to said speech output modules in said group, and wherein said selector, if said one of said modules to which said input signal is routed is a speech output module in said group, routes said input signal through said post-processing module.

5. A speech processing system as claimed in claim 1 wherein said plurality of speech recognition modules comprise a speech recognition module for individual numerical recognition, a speech recognition module for recognition of chains of numerals, a speech recognition module for recognition of words from a limited vocabulary, a speech recognition module for recognition of an individual word with an unlimited vocabulary, a speech recognition of an individual word with an unlimited vocabulary, a speech recognition of speech spoken in a flowing manner with an unlimited vocabulary, a speech recognition module for recognition of predetermined word combinations, a speech recognition module for key word recognition, a speech recognition module for alphabet recognition, a speech recognition module for sound sequence recognition, a speech recognition module for speech recognition module for speech recognition, and a speech recognition module for DTMF recognition.

6. A speech processing system as claimed in claim 1 wherein said plurality of speech output modules comprise a speech output module for output of predetermined stored speech components, a speech output module for output of predetermined stored speech components, a speech output module for output of combined individual predetermined stored speech components, a speech output module for output of words synthesized from stored phone names, and a speech output module for output of DTMF tones.

7. A speech processing system as claimed in claim 1 further comprising a dialog sequence control connected to said selector for controlling a dialog between said selector and a user.

8. A speech processing system as claimed in claim 7 wherein said dialog sequence control generates said input signal.

9. A speech processing method comprising:
providing a plurality of modules of respectively different types including speech recognition modules for respectively different types of speech recognition and speech output modules for respectively different types of speech output, each of the speech recognition modules and each of the speech output modules being respectively constructed specifically for a different type of speech recognition or speech output;
analyzing an input signal to be processed to identify a type of speech recognition and a type of speech output needed to communicate with a user;
selecting one of the speech recognition modules and one of the speech output modules according to the analysis of the input signal;
routing said input signal to one of said modules according to the analysis of the input signal;
recognizing speech from the user using only the selected speech recognition module; and
outputting speech to the user using only the selected speech output module such that two-way oral communication is performed with the user using the selected speech recognition module and the selected speech output module.

10. A speech processing method as claimed in claim 9 comprising the additional step of:
If said input signal is routed to at least one of said speech recognition modules in said plurality of modules, pre-processing said input signal before processing said input signal in said at least one of said speech recognition modules.

11. A speech processing method as claimed in claim 9 comprising the additional step of:
if said input signal is routed to at least one of said speech output modules in said plurality of modules, post-processing said input signal after processing said input signal in said at least one of said speech output modules.

* * * * *